Figure 1:
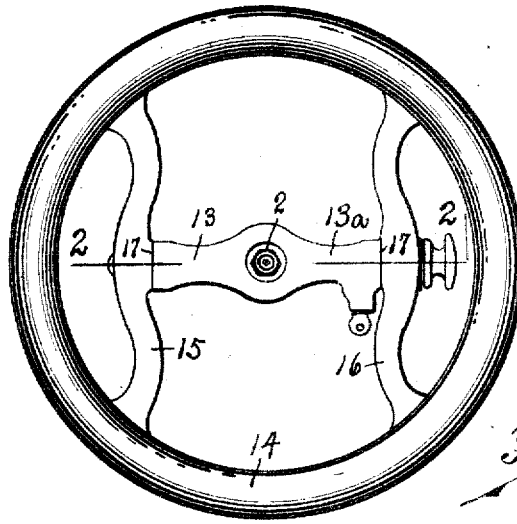

Dec. 11, 1923.

E. H. VINCENT

TILTING AND LOCKING STEERING WHEEL

Filed Nov. 17, 1919      4 Sheets-Sheet 1

1,476,742

Edward H. Vincent
By Edward N. Pagelsen

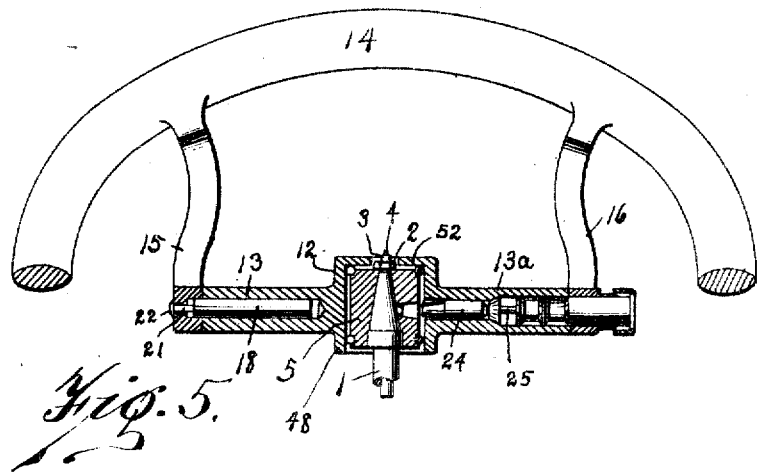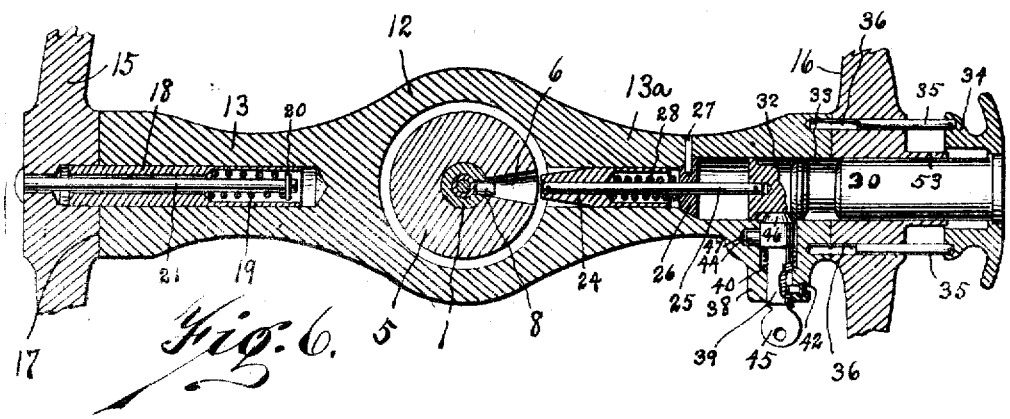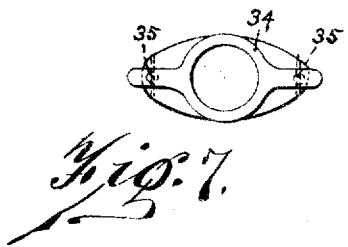

Dec. 11, 1923.

E. H. VINCENT 1,476,742

TILTING AND LOCKING STEERING WHEEL

Filed Nov. 17, 1919    4 Sheets-Sheet 3

Inventor
Edward H. Vincent
By Edward N. Pagelsen
Attorney

Dec. 11, 1923.
E. H. VINCENT
1,476,742
TILTING AND LOCKING STEERING WHEEL
Filed Nov. 17, 1919  4 Sheets-Sheet 4
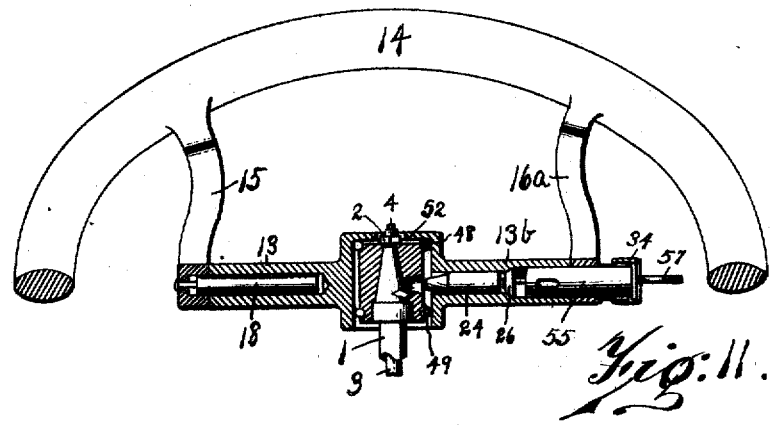
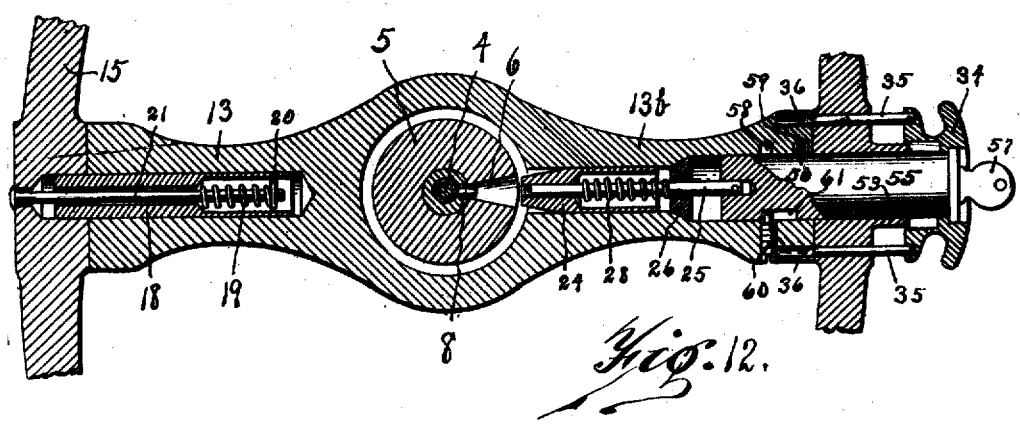
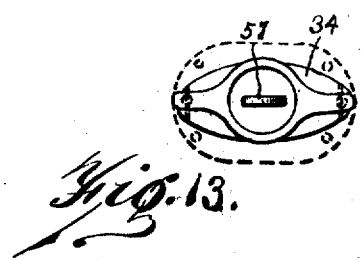
Inventor
Edward H Vincent
By Edward N. Pagelsen
Attorney Patented Dec. 11, 1923.

1,476,742

UNITED STATES PATENT OFFICE.

EDWARD H. VINCENT, OF DETROIT, MICHIGAN.

TILTING AND LOCKING STEERING WHEEL.

Application filed November 17, 1919. Serial No. 338,582.

*To all whom it may concern:*

Be it known that I, EDWARD H. VINCENT, a citizen of the United States, and residing at Detroit, in the county of Wayne and State of Michigan, have invented a new and Improved Tilting and Locking Steering Wheel, of which the following is a specification.

This invention relates to steering wheels for motor vehicles of the same general character as that shown in my prior United States Patent No. 1,269,341, dated June 11, 1918, and its object is to provide a steering wheel which may be locked to or unlocked from the steering rod, to provide a steering wheel which may be tilted, whereby proper clearance to permit the driver of the vehicle to easily enter or leave his seat may be obtained, and to provide a wheel which may, at will, be locked to enable it to turn the steering rod or be unlocked to permit it to turn freely on the steering rod, connecting mechanism being provided whereby the wheel is prevented from tilting when the wheel and steering rod are caused to turn together and whereby the wheel is permitted to simultaneously tilt and turn on the rod.

This invention consists in a steering rod and a steering head mounted thereon, a wheel carried by the head, a locking bolt to connect the head to the rod when in one position and to disconnect the head from the rod when moved to another position, and a key operated lock to secure the locking bolt in either position.

It further consists in pivots mounted in the head and in mounting the wheel on these pivots, and in means to prevent the wheel from tilting on these pivots, said means being operatively connected to the locking bolt and controlled by the same lock.

It also consists in a bushing secured to the steering post and formed with circumferential grooves, split rings mounted in these grooves, and a steering head fitting over the bushing, the bore of the steering head being such that the head will fit around these split rings and thus obtain line bearings.

It also consists in securing one of the pivots for the wheel rigidly in the head and in making it hollow, a spring being mounted in the pivot and a bolt passing from a spider arm of the wheel longitudinally into the pivot and connecting to the spring which thus causes friction between the spider and the head.

It also consists in making the other pivot of the wheel longitudinally movable, and in connecting the locking bolt thereto, the movement of the locking bolt being controlled by a key operated lock.

It also consists in the details of construction illustrated in the accompanying drawings and particularly pointed out in the claims.

Figure 4:
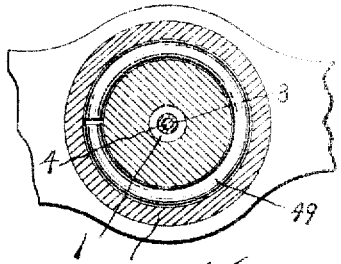
Figure 2:
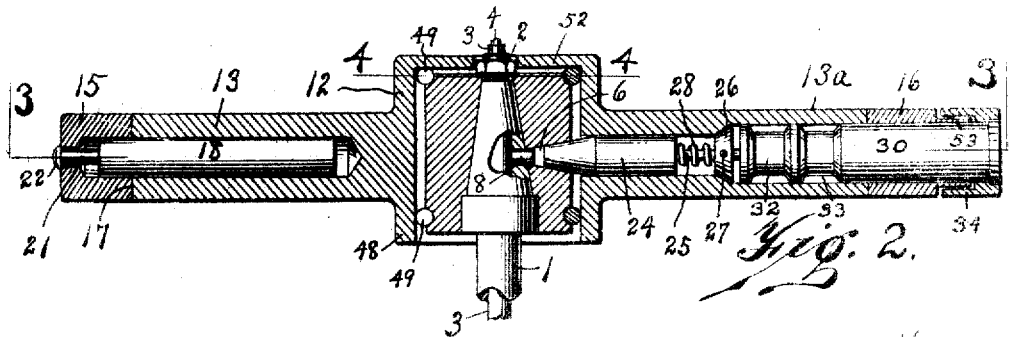
Figure 3:
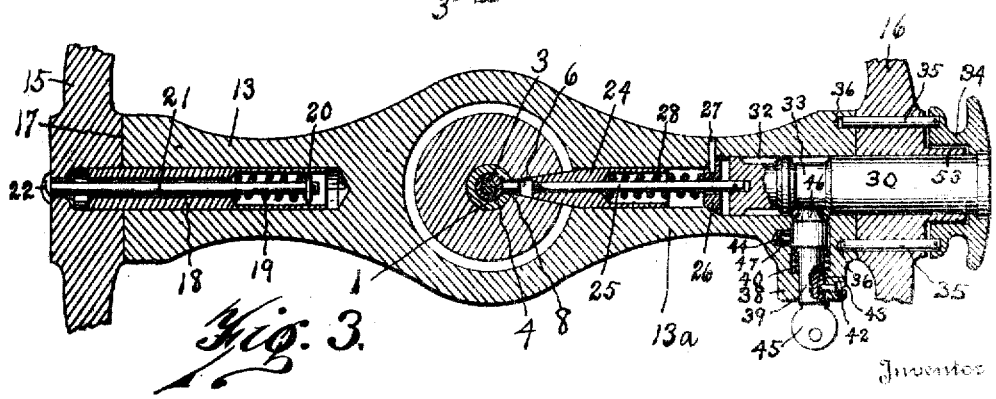
Figure 8:
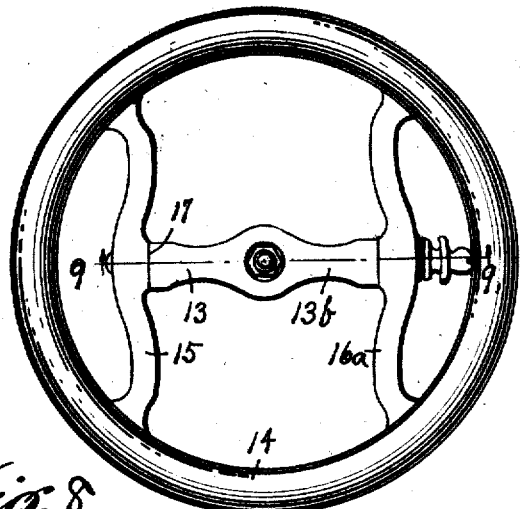
Figure 9:
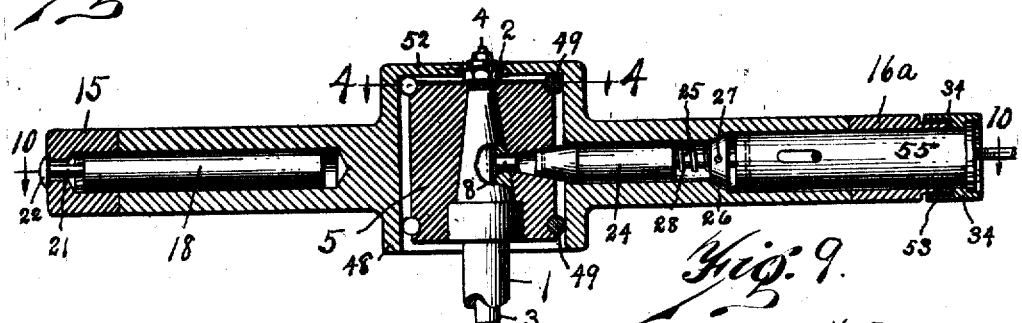
Figure 10:
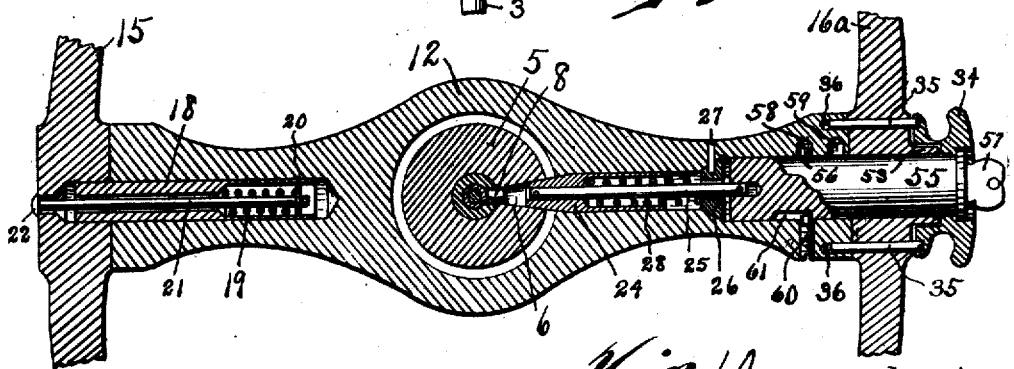

In the accompanying drawings, Fig. 1 is a plan of a steering wheel embodying the present invention. Fig. 2 is a section on the line 2—2 of Fig. 1 on a larger scale. Fig. 3 is a section on the line 3—3 of Fig. 2. Fig. 4 is a section on the line 4—4 of Figs. 2 and 9. Fig. 5 is a section similar to the section shown in Fig. 2 with the locking bolt withdrawn, the parts being on a smaller scale. Fig. 6 is a section similar to Fig. 3 with the locking bolt shown in withdrawn position. Fig. 7 is an end elevation of the controlling knob. Fig. 8 is a plan of a modified form of steering wheel. Fig. 9 is a section on the line 9—9 of Fig. 8. Fig. 10 is a section on the line 10—10 of Fig 9. Figs. 11 and 12 are sections of this modified structure similar to Figs. 5 and 6. Fig. 13 is an end elevation of the controlling knob therefor.

Similar reference characters refer to like parts throughout the several views.

The steering rod 1 shown in the drawings is of any desired character and size and is preferably formed with an enlarged tapering upper end which is threaded to receive the nut 2 and is made hollow to receive the tube 3 and rod 4. To this rod 1 is secured a bushing 5, preferably cylindrical, which has a transverse hole 6 in the bottom of which and in a hole in the upper end of the steering post is a pin 8 which prevents the bushing from turning on the steering post. The pin 8 may be omitted if desired. This pin cannot be removed to disconnect the bushing from the steering post until the steering head has been removed from the bushing. This steering head consists of a central cylindrical portion 12 and two arms 13 and 13ᵃ. The ends of these arms are preferably at right angles to a central line passing through the center of the steering post. The steering wheel has a rim 14 and a pair of spider arms 15 and 16 provided with faces 17 which engage the ends of the arms 13 and 13ᵃ of the steering head. Any desired connection between the spider and the rim may be employed.

The arm 13 of the head is provided with a central hole in which is rigidly mounted a sleeve 18 and in this sleeve is a spring 19 which engages a washer 20 on the end of a stem 21 whose head 22 is on the outside of the spider arm 15 of the spider. The sleeve 18 extends a distance into the spider arm 15 of the wheel and forms a pivot therefor and the spring 19 pulls the face 17 of the spider arm 15 against the end of the arm 13 and thus causes frictional contact.

The opposite arm 13ᵃ of the head is also bored in alinement with the sleeve 18 and in it is slidably mounted the locking bolt 24 which is tapering at its inner end to fit the hole 6 in the bushing. A stem 25 is permanently secured in this bolt 24 and extends outwardly through a collar 26 which is held in position by the pin 27. A spring 28 within this bolt 24 bears against the collar 26 and normally presses the bolt 24 inwardly toward the steering rod.

The outer end of the stem 25 is secured to the cylindrical pivot 30 which is provided with circumferential grooves 32 and 33. To the outer end of this cylinder is secured the knob 34 to which are connected the pins 35 which are slidable in holes in the spider arm 16 and which pins may also enter the holes 36 in the end of the arm 13ᵃ of the head. This spider arm is pivoted on this cylinder 30. As this cylinder 30 is connected to the stem 25, the spring 28 will always tend to pull this cylinder and the knob 34 inwardly toward the steering post.

Mounted in a boss 38 on this arm 13ᵃ is a cylindrical lock body 39 which is normally held inwardly by means of a spring 40. This lock body is prevented from turning by means of the screw pin 42 whose inner end enters a groove 43 in the barrel of the lock. This lock is provided with a pin 44 which is pulled in when the key 45 is turned. The tapering inner end 46 of the body of this lock is adapted to fit in the grooves 32 and 33.

When the parts are in the position shown in Figs. 2 and 3, the cylinder 30 and the bolt 24 are in their inner position and are prevented from moving outwardly by means of the tapering end 46 of the lock body being fitted in the groove 33 in the cylinder 30.

In Fig. 3, the pins 35 are in the holes 36 in the end of the arm 13ᵃ of the head and the head is locked to the bushing. The rim 14, the spider arms, the head 10 and the bushing now act as a unit with the steering post and the different parts cooperate as if made of one piece. When it is desired to leave unattended the vehicle upon which this steering mechanism is mounted, the key 45 is inserted in the lock and turned so as to withdraw the pin 44 from the recess 47 in which it is shown seated in Fig. 3. This releases the cylinder 30, which can be drawn outwardly by means of the knob 34, moving with it the locking bolt 24 which is withdrawn from the hole 6 in the bushing. At the same time the pins 35 are withdrawn from the holes 36 in the end of the arm 13ᵃ and the wheel is permitted to swing on the axis of the sleeve 18 and of the cylinder 30. When the cylinder 30 has been withdrawn sufficiently far to bring the groove 32 in alinement with the point 46 of the lock body, the key 45 being released, the spring 40 will push the lock body inwardly until the pin 44 comes in alinement with the recess 47, whereupon this pin will be permitted to move out into this recess 47 or be forced into this recess by the turning of the key 45.

When the parts are in this position, which is shown in Fig. 6, the locking pin 24 is entirely disengaged from the bushing on the steering post and the wheel can be freely turned with reference to this steering post as well as freely tilted on the axis of the sleeve 18 and the cylinder 30. The pins 35 can no longer register with the holes 36 and the whole construction is useless as a steering wheel.

To bring the structure again into operative condition, it is necessary to insert the key 45, pull back the lock barrel to release the cylinder 30, and permit the spring 28 to pull in the cylinder 30 until the parts are in the position shown in Fig. 3. The lock barrel is then permitted to slide back to the position shown in Fig. 3 and the key is turned to normal position and withdrawn, thereby locking the parts.

In order to prevent the flange 48 on the head from being pressed down by means of a heavy clamp onto the bushing, which would enable a thief to turn the steering post by means of the steering wheel, I have placed two split rings 49 within the bore of the cylindrical portion 12 of the head. The bushing is grooved to receive these split rings and the rings are of such size that they bear on the interior of the bore of the cylindrical portion 12 of the head and the upper ring also bears against the central portion 52 of the head. This results in three line contacts or bearings.

It will be noticed that these rings 49 are so mounted in the grooves that they cannot move endwise of the bushing. The bolt 24, when the parts are in the position shown in Fig. 6, extends into the space between the bushing and the inner surface of the steering head and the steering head cannot therefore be slipped up off the bushing because the end of the bolt 24 will engage the upper ring 49.

If the lock 46 is held out by means of a key, the cylinder 30 can be withdrawn sufficiently to carry the inner end of the bolt entirely beneath the inner surface of the head and so will avoid engagement with the upper ring when the head is to be removed from the bushing. Thereafter, the bolt 24 can be detached from the stem 25 and the cylinder 30 be entirely removed from the head.

The bar 16 has a cylindrical flange 53 surrounding the cylinder 30 and extending into the knob 34 and this flange is of such a length that the cylinder 30 cannot be reached with a tool at any time.

The structure shown in Figs. 8 to 13 differs from that shown in Figs. 1 to 7 in that the lock body is in alinement with the sleeve 18 and the locking bolt 24. The lock body 55 is cylindrical and has a pin 56 which may be moved by the key 57 into and out of the recesses 58 and 59, and the lock body is held from turning by the pin 60 which extends into the groove 61 in the lock body. The stem 25 is connected into the inner end of this lock body. The knob 34 connects directly to the outer end of this lock body.

In Fig. 13, the end of the arm 13b of the head 12 is indicated in dotted lines and the locations of several additional recesses 36 are shown. With these additional recesses, the spider may be locked in one or another tilted position when the wheel has been moved to bring the pins 35 into alinement with these additional recesses.

When the key is inserted and turned to withdraw the pin 56 from the recess 58, the knob 34 may be drawn out to the position shown in Fig. 12 at which point the key may be turned back to permit the pin to enter the recess 59. It will be understood that the pin is somewhat loose in this recess 59 so that the spring 28 may pull the inner ends of the pins 35 against the end of the arm 13b and hold the cross bar 16a and the wheel in any desired position relative to the steering head. The other parts of the structure shown in Figs. 8 to 13 are substantially the same as shown in Figs. 1 to 7.

The opening in the central portion 52 of the head is preferably just large enough to permit the nut 2 to turn therein but is too small to admit a tool to turn the nut on the stearing rod and the top of the nut is below the upper surface of this portion 52. The nut cannot therefore be removed until the head has been taken off.

The details and proportions of the various parts may all be changed by those skilled in the art without departing from the spirit of my invention as set forth in the following claims.

I claim:—

1. In combination, a steering rod for motor vehicles, a head rotatably mounted thereon, a steering wheel carried by the head, a locking bolt whereby the rod is normally caused to rotate with the head and wheel, said wheel being rotatable on the rod when the locking bolt is in inoperative position, and means to maintain said locking bolt in either operative or inoperative position, said wheel also having another movement in respect to the steering rod at an angle to the rotary movement.

2. In combination, a steering rod for motor vehicles, a head rotatably mounted thereon, a steering wheel carried by the head, locking means whereby the rod is normally caused to turn with the head and wheel, said wheel being simultaneously capable of angular movement about the axis of the rod and tiltable at an angle thereto when the locking means has been moved to inoperative position, and means to maintain the locking means in inoperative position.

3. In combination, a steering rod for motor vehicles, a head mounted on the rod, a steering wheel carried by the head and capable of simultaneous angular movement about the axis of the rod and of tilting at an angle to said axis, a locking device to cause the wheel, head and rod to turn together and to prevent the wheel from tilting when said locking device is in operative position, and a key operated lock to hold the locking device in operative position.

4. In combination, a steering rod for motor vehicles, a head mounted thereon, a steering wheel tiltably mounted on the head, said wheel and head capable of angular movement on the rod, a locking device adapted to cause the wheel, head and rod to turn together and prevent the wheel from tilting when the locking device is in operative position and adapted to permit the wheel and head to turn on the rod and the wheel to tilt when the locking device is in inoperative position, and a key operated lock to hold the locking device in inoperative position.

5. In combination, a steering rod for motor vehicles, a head mounted thereon, a steering wheel tiltably mounted on the head, said wheel and head capable of angular movement on the rod, a locking device adapted to cause the wheel, head and rod to turn together and prevent the wheel from tilting when the locking device is in operative position and adapted to permit the wheel and head to turn on the rod and the wheel to tilt when the locking device is in inoperative position, and a key operated lock adapted to hold the locking device in operative or inoperative position at will.

6. In combination, a steering rod for motor vehicles, a head rotatably mounted thereon, a steering wheel pivotally mounted on said head, the pivotal line of the wheel passing through the axis of the rod and at right angles thereto, a radially movable bolt mounted in the head and adapted to lock the head to the steering rod, a knob to withdraw the bolt to inoperative position, and independent means operated by the knob to connect the wheel to the head to prevent the wheel from tilting.

7. In combination, a steering rod for motor vehicles, a head rotatably mounted thereon, a steering wheel pivotally mounted on said head, the pivotal line of the wheel passing through the axis of the rod and at right angles thereto, a radially movable bolt mounted in the head and adapted to lock the head to the steering rod, a knob to withdraw the bolt to inoperative position, independent means operated by the knob to connect the wheel to the head to prevent the wheel from tilting, and a key operated lock to secure the bolt in its outer position and the locking bolt in its inoperative position.

8. In combination, a steering rod for motor vehicles, a head rotatably mounted thereon, a steering wheel pivotally mounted on said head, the pivotal line of the wheel passing through the axis of the rod and at right angles thereto, a radially movable bolt mounted in the head and adapted to lock the head to the steering rod, a knob to withdraw the bolt to inoperative position, independent means operated by the knob to connect the wheel to the head to prevent the wheel from tilting, and a key operated lock to secure the locking bolt in either operative or inoperative position and the knob in inner or outer position.

9. In combination, a steering rod for motor vehicles, a head mounted thereon and having substantially radial arms, alined pivots mounted in the arms radially of said rod, a steering wheel comprising a rim and spider portions mounted on said pivots, one of said pivots being longitudinally movable, a handle mounted on the end of the movable pivot, and a pin connected to said handle and extending parallel to the pivots through a hole in the spider and adapted to enter a recess in the end of the adjacent arm of the head to lock the wheel from tilting on said pivots when the handle has been moved in.

10. In combination, a steering rod, a head mounted thereon for relative angular movement about the axis of the rod, a wheel structure tiltable in respect to the head, and an element movable in the line of the axis about which the wheel structure tilts for securing at will the head against relative rotation in respect to the rod.

11. In combination, a steering rod, a head mounted thereon for relative angular movement about the axis of the rod, a wheel structure tiltable in respect to the head, about an axis which intersects the axis of the rod.

12. In combination, a steering rod, a head mounted thereon for relative angular movement about the axis of the rod, a wheel structure tiltable in respect to the head, and an element movable in the line of the axis about which the wheel structure tilts for securing the head at will against relative rotation in respect to the rod, and for securing the wheel structure against tilting in respect to the head.

13. In combination, a steering rod, a head mounted thereon, a pivot fixed in the head, a wheel structure tiltable about said pivot, and resilient means embodied in said pivot within the confines of the head for drawing the wheel structure against the head.

14. In combination, a steering rod, a head mounted thereon, an axially bored pivot fixed in the head, a wheel structure tiltable about said pivot, and resilient means embodied in said pivot for drawing the wheel structure against the head.

15. In combination, a steering rod, a head mounted thereon, a pivot fixed in the head, a wheel structure tiltable about said pivot, a member passing through said pivot and connected to the wheel structure, and resilient means housed in the head and cooperating with said member to draw the wheel structure to the head.

16. In combination, a steering rod, a head mounted thereon for relative angular movement about the axis of the rod, a wheel structure tiltable in respect to the head, and an element movable in the line of the axis about which the wheel structure tilts for securing the head against relative rotation in respect to the rod at will, said element being spring pressed toward the position in which it holds the wheel structure from angular movement about the axis of the rod.

17. In combination, a steering rod for motor vehicles, a head mounted thereon, a steering wheel carried by the head, locking means whereby the rod is normally caused to rotate with the wheel, said wheel being capable of rotation about the rod when the locking means are in inoperative position, and means to maintain said locking means in either operative or inoperative position, said wheel also having another movement in addition to its rotary movement.

18. In combination, a steering rod for motor vehicles, a head rotatably mounted thereon, a radially movable bolt mounted in the head and adapted to lock the head to the steering rod, a knob to withdraw the bolt to inoperative position, said bolt having a plurality of recesses, and a key operated lock having a member to enter said recesses and secure the bolt in its outer or inner position at will.

19. In combination, a steering rod for motor vehicles, a head mounted thereon and having substantially radial arms, alined pivots mounted in the arms radially of said rod, a steering wheel comprising a rim and spider portions mounted on said pivots, one of said pivots being longitudinally movable, a handle mounted on the end of the movable pivot, and a pin connected to said handle and extending parallel to the pivots through a hole in the spider and adapted to enter one or another of a series of recesses in the end of the adjacent arm of the head to lock the wheel in either of a series of positions from tilting on said pivots when the handle has been moved in.

20. In combination, a steering rod for motor vehicles, a head mounted thereon, aligned pivots mounted in the head radially of said rod, a steering wheel comprising a rim and spider portions mounted on said pivots, one of said pivots being longitudinally movable, a handle mounted on the end of the movable pivot, a locking bolt connected to said handle and adapted to lock the head to the steering rod, a pin connected to said handle and extending parallel to the pivots through a hole in the spider and adapted to enter a recess in the head to lock the wheel from tilting on said pivots when the handle is moved in, and a spring to move said handle inward and said locking bolt to locking pisition.

21. In combination, a steering rod for motor vehicles, a head mounted thereon, a steering wheel mounted on the head, said wheel and head capable of rotating on the rod, a locking device adapted to cause the wheel, head and rod to turn together when the locking device is in operative position, said locking device embodying a longitudinally movable bolt, and a key operated lock embodying a member movable longitudinally at an angle to said locking bolt to hold the locking bolt in inoperative position.

22. In combination, a steering rod for motor vehicles, a head rotatably mounted thereon, a steering wheel pivotally mounted on said head, the pivotal line of the wheel passing through the axis of the rod at right angles thereto, a radially movable bolt mounted in the head and adapted to lock the head to the steering rod, a knob to withdraw the bolt to inoperative position, and a key operated lock to secure the locking bolt in inoperative position, said knob being formed with a cylindrical recess adjacent said head and said head being formed with a cylindrical flange extending into said recess and surrounding the locking bolt, the length of said flange being greater than the total movement of the knob when moving said bolt to inoperative position.

23. In combination, a steering rod, a steering head rotatably mounted on said rod, a steering wheel comprising a rim and two spider arms, said spider arms engaging opposite ends of said head, pivots for said spider arms mounted in said head, one of said pivots being longitudinally movable, a lock mechanism connected to said movable pivot and adapted to connect said head to said steering rod, and a lock to prevent longitudinal movement of said movable pivot.

24. A steering wheel adapted to be secured to the steering post of an automobile, comprising a rim, means pivotally secured to said rim and to said steering post, and means for positively locking said pivoted means to said steering post and to said rim.

25. A steering wheel adapted to be secured to the steering post of an automobile, comprising a rim, means pivotally secured to said rim and to said steering post, means for positively locking said pivoted means to said steering post and to said rim, and means for locking said locking means in inoperative position.

26. A steering wheel adapted to be secured to the steering post of an automobile, comprising a rim, means pivotally secured to said rim and to said steering post, and means including a bolt for positively locking the pivoted means to said steering post and to said rim.

27. A steering wheel adapted to be secured to the steering post of an automobile, comprising a rim, means pivotally secured to said rim and to said steering post, means including a bolt for positively locking the pivoted means to said steering post and to said rim, and means for locking said bolt in the operative and inoperative positions.

28. A steering wheel adapted to be secured to the steering post of an automobile, comprising a rim, means pivotally secured to said rim and to said steering post, means including a bolt for positively locking the pivoted means to said steering post and to said rim, a spring for resiliently retaining said bolt in said locking position, and manually operated means for retracting the bolt.

29. A steering wheel adapted to be secured to the steering post of an automobile, comprising a rim, means pivotally secured to said rim and to said steering post, means including a bolt for positively locking the pivoted means to said steering post and to said rim, a spring for resiliently retaining said bolt in said locking position, manually operated means for retracting the bolt, and means for locking said bolt in retracted position.

30. A steering wheel adapted to be secured to the steering post of an automobile, comprising a rim, a spider structure secured to said rim, arms pivoted to said spider structure and on said steering post, and means for positively locking said arms to said steering post and to said rim.

31. A steering wheel adapted to be secured to the steering post of an automobile, comprising a rim, a spider structure secured to said rim, arms pivoted to said spider structure and on said steering post, means for positively locking said arms to said steering post and to said rim, and means for locking said locking means in inoperative position.

32. A steering wheel adapted to be secured to the steering post of an automobile, comprising a rim, a spider structure secured to said rim, arms pivoted to said spider structure and on said steering post, a bolt for positively locking the arms to said steering post and to said rim, a spring for resiliently retaining said bolt in said locking position, manually operated means for retracting the bolt, and means for locking said bolt in operative and inoperative positions.

33. A steering wheel adapted to be secured to the steering post of an automobile, comprising a hub mounted for rotation on said steering post, a rim pivotally mounted on said hub whereby the rim may be turned from a plane normal to the rotative axis of the hub to a plane approaching parallelism therewith, and means for positively locking the hub for rotation with said steering post and the rim in a plane normal to the rotative axis of said hub.

34. A steering wheel adapted to be secured to the steering post of an automobile, comprising a hub mounted for rotation on said steering post, a rim pivotally mounted on said hub whereby the rim may be turned from a plane normal to the rotative axis of the hub to a plane approaching parallelism therewith, means for positively locking the hub for rotation with said steering post and the rim in a plane normal to the rotative axis of said hub, and means for locking said locking means in operative and inoperative positions.

35. A steering wheel comprising means adapted to be journaled to a steering post, a hand ring pivotally mounted on said journaled means, and means positively locking the journaled means to the hand ring.

36. In a steering wheel, a rotatable post, a collar rigid with said post, an operating handle, a pivoted leverage member spinning freely on said post above said collar regardless of the position of said handle in its pivotal mounting and means for operatively connecting the leverage member and said post and coincidently locking said handle from tilting movement.

37. In a device of the character described, a steering wheel adapted to be tilted in relation to the steering post, means for operably connecting or disconnecting the wheel from the post, and means for securing said wheel against tilting adapted to be manually operated simultaneously with and by the means for operably connecting the steering wheel with the steering post.

38. In a device of the character described, a steering post, an enlarged head or bushing fitted to the post, a steering wheel hub sleeved upon the head, a steering wheel having a supporting frame pivoted to the hub, a plunger carried by the steering wheel adapted to enter a bore in the enlarged head to secure the steering wheel in operative relation to the post, and a pair of bolts spaced apart and connected with said plunger for simultaneous operation therewith, whereby the steering wheel may be secured against tilting and in operative relation to the steering post.

39. In combination, a steering rod for motor vehicles, a head rotatable thereon, a radially movable bolt mounted in the head and comprising an inner member for engagement with the steering rod and an outer member connected to the inner member by means of a stem, a spring mounted on the stem adjacent the locking bolt and adapted to force said locking bolt inwardly, an abutment for the spring, and a knob connected to the outer end of the outer member whereby the locking bolt and said outer member may be moved outwardly.

40. A steering wheel comprising a hand ring, a spider structure secured to the hand ring, a connecting member journaled to said spider structure and mounted for rotation on a steering post, and means for locking the connecting member for rotation with the steering post.

41. A steering wheel comprising a hand ring, spiders secured to the hand ring, a connecting member journaled to the spiders, a hub journaled in the connecting member and secured to a steering post, and means for locking the connecting member against rotation upon the hub.

42. A steering wheel comprising a hand ring, a spider structure secured to said ring, a connecting member journaled to said spider structure, an enlarged portion formed upon the connecting member and having a circular opening, a hub journaled in the opening and secured to a steering post, and means carried by the connecting member for locking the hub against rotation in said circular opening.

43. A steering wheel comprising a hand ring, a spider structure secured to said hand ring, a connecting member journaled to said spider structure, a hub journaled in the connecting member and secured to a steering post, a spring pressed pin slidable in the connecting member and adapted to engage the hub to lock the connecting member against rotation upon the hub, and means for locking the pin from engagement with the hub.

44. A steering wheel comprising a hand ring, a spider structure secured to the hand ring, a connecting member journaled to the spider structure, a hub rotatably carried by the connecting member and secured to a steering post, a spring pressed pin slidably mounted in the connecting member and adapted to engage the hub to lock the connecting member against rotation upon the hub, and a lock carried by the connecting member and adapted to hold the spring pressed pin from engagement with the hub, to permit the connecting member to rotate freely upon the hub.

45. A steering wheel mechanism comprising a sleeve secured upon a steering shaft, a casing member rotatable around said sleeve adapted to be locked thereto, and a steering wheel journaled on said casing member at an axis transverse that of the steering shaft to permit tilting of the wheel into different planes.

46. A steering wheel comprising a hand ring, spiders secured to the hand ring, a connecting member journaled to said spiders and mounted for rotation on a steering post, means for locking the connecting member for rotation with the steering post, and means for retaining the spiders in fixed position on said connecting member.

47. A steering wheel comprising a hand ring, a spider structure secured to the hand ring, a connecting member journaled to said spider structure and mounted for rotation on a steering post, means for locking the connecting member for rotation with the steering post, and resilient means interposed between the spider structure and the connecting member for releasably retaining the hand ring in a plane substantially perpendicular to its axis of rotation.

48. A steering wheel comprising a hand ring, a connecting member journaled to said ring and mounted for rotation on a steering post, means for locking the connecting member for rotation with the steering post, and means for retaining the hand ring in fixed position on said connecting member.

49. A steering wheel comprising means adapted to be journaled to a steering post, a hand ring pivotally mounted on said journaled means and means for locking the journaled means to the steering post, whereby the torque of the steering wheel is transmitted through said journaled means to said steering post.

50. A steering wheel comprising a hand ring, a spider structure secured to the hand ring, a connecting member journaled to said spider structure and mounted for rotation on a steering post, and a key operated lock for causing the steering post to turn with the connecting member and for preventing the hand ring and spider structure from turning on the connecting member.

51. A steering wheel comprising a hand ring, a spider structure secured to the hand ring, a connecting member journaled to said spider structure, and a key operated lock for causing the steering post to turn with the connecting member when the lock is in one position and to permit the connecting member to turn on the steering post when the lock is in a second position, said steering post and said lock having parts which may engage to prevent the removal of the wheel from the rod when the lock is in its second position.

52. A steering wheel comprising a hand ring, a spider structure secured to the hand ring, a connecting member journaled to said spider structure and mounted for rotation on a steering post, a key operated lock for causing the steering post to turn with the connecting member and for preventing the hand ring and spider structure from turning on the connecting member when said lock is in one position and for releasing the steering post and the hand ring and spider structure from the connecting member when the lock is in a second position, and means actuated by said lock to secure the lock in either of said two positions.

53. A steering wheel comprising a hand ring, a spider structure secured to the hand ring and adapted for rotation on the axis of a steering post and a tilting movement at an angle to the post, a key operated lock for causing the steering post to turn with the spider structure.

54. A steering wheel comprising a hand ring, a spider structure secured to the hand ring and adapted for rotation on the axis of a steering post and a tilting movement at an angle to the post, a key operated lock when in one position permitting and when in another position preventing the spider structure from rotation on the axis of the post, and means to positively secure said lock in either of the two positions.

55. A steering wheel comprising a hand ring, a spider structure secured to the hand ring, a connecting member pivoted to said spider structure and mounted for rotation on a steering post, and a key controlled locking bolt for causing the steering post to turn with the connecting member.

56. In combination, a rotatable steering rod, a wheel head mounted thereon, a steering wheel structure tiltable on said wheel head, and means to simultaneously control the rotation of the rod by said wheel head and the tilting of the steering wheel on the head.

57. In combination, a rotatable steering rod, a wheel head mounted thereon, a steering wheel structure tiltably mounted on said wheel head, means to control the rotation of the rod by said wheel head, and means to control the tilting of the steering wheel on the wheel head.

58. In combination with a rotatable steering rod, supporting means mounted thereon, a steering wheel structure embodying a hand rim and a spider tiltably mounted on said supporting means, and key controlled means adapted when in one position to prevent rotation of the rod by the steering wheel structure and allow tilting of the wheel structure on said supporting means and when in another position to allow rotation of the rod by the wheel structure and prevent tilting of the wheel structure on said supporting means.

59. In combination with rotatable steering rod, supporting means mounted thereon, a steering wheel structure embodying a hand rim and a spider movably mounted on said supporting means, and slidable locking means adapted when in one position to prevent rotation of the rod by the steering wheel structure and allow movement of the wheel structure on said supporting means and when in another position to allow rotation of the rod by the wheel structure and prevent movement of the wheel structure on said supporting means.

60. In combination with a rotatable steering rod, supporting means mounted thereon, a steering wheel structure embodying a hand rim and a spider movably mounted on said supporting means, and key controlled means slidable to two positions at an angle to the rod and adapted when in one position to prevent rotation of the rod by the wheel structure and allow movement of the wheel structure on said supporting means and when slid to another position to allow rotation of the rod by the wheel structure and prevent movement of the wheel structure on said supporting means.

61. In combination with a rotatable steering rod and a head carried thereby, a wheel structure movable on said head, a movable lock, and releasable means movable by the operation of the lock to control the rotation of said rod by said head and the movement of said wheel structure on said head.

EDWARD H. VINCENT.